Aug. 23, 1932.  F. L. VAN WEENEN  1,872,851
WEIGHING APPARATUS
Filed May 7, 1928    5 Sheets-Sheet 1

Fig. 1.

Inventor:
Franciscus L. van Weenen
By Nissen & Crane Attys.

Aug. 23, 1932.    F. L. VAN WEENEN    1,872,851
WEIGHING APPARATUS
Filed May 7, 1928    5 Sheets-Sheet 4

Inventor:
Franciscus L. van Weenen
By Nissen & Crane
Attys.

Aug. 23, 1932.  F. L. VAN WEENEN  1,872,851
WEIGHING APPARATUS
Filed May 7, 1928   5 Sheets-Sheet 5
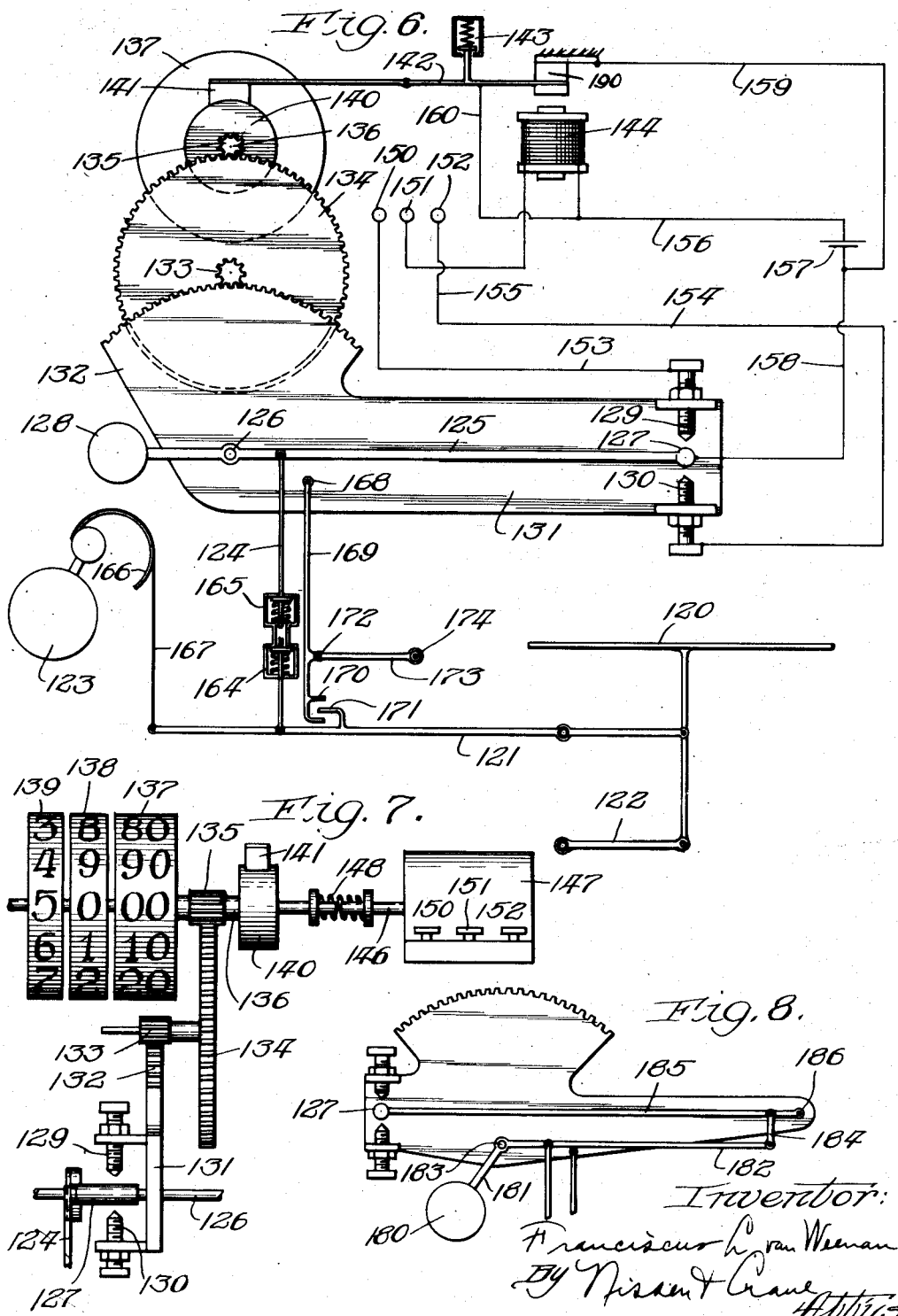

patented Aug. 23, 1932

1,872,851

UNITED STATES PATENT OFFICE

FRANCISCUS LAMBERTUS VAN WEENEN, OF ROTTERDAM, NETHERLANDS, ASSIGNOR TO NAAMLOOZE VENNOOTSCHAP MAATSCHAPPIJ TOT VERAARDIGING VAN SNIJMACHINES VOLGENS VAN BERKEL'S PATENT EN VAN ANDERE WERKTUIGEN, OF ROTTERDAM, NETHERLANDS, A LIMITED LIABILITY COMPANY OF THE NETHERLANDS

WEIGHING APPARATUS

Application filed May 7, 1928, Serial No. 275,818, and in Great Britain May 31, 1927.

This invention relates to weighing apparatus and refers more particularly to weighing scales of the pendulous resistant type having indicating mechanism showing the weight and (or) value or price of the article to be weighed.

In scales of the pendulous resistant type it is the usual practice for the indicating mechanism to be mechanically moved by the weighing mechanism, but this limits the size of the indicating mechanism owing to the friction set up in the latter which re-acts on and interferes with the sensitivity of the weighing mechanism.

To overcome this defect, and to allow indicating mechanism of any convenient size to be provided, it is proposed, according to this invention, to provide weighing apparatus with the indicating mechanism which is electrically moved under the control of the weighing mechanism.

To effect this movement, the load pan closes an electrical circuit for driving an electrical actuating device for the load indicating mechanism, said circuit being automatically interrupted when the indicating mechanism has been moved proportionately to the load pan.

The load pan of the weighing apparatus always moves to either side of a balanced position according to whether a load is placed upon or removed therefrom and it is therefore arranged that this movement closes the circuits of an electrical actuating device for moving the load indicating mechanism, one circuit being closed when the load pan moves in one direction to cause the actuating device to move the indicator in a predetermined direction and another circuit being closed when the load pan moves in an opposite direction to cause the actuating device to move the indicator in an opposite direction, the circuits being automatically interrupted when the indicator has been moved proportionately to the load pan.

In particular, the weighing apparatus is provided with a control device having an arm so connected with the load pan as to be movable to one side, or the other, of a neutral position, according to whether the load pan rises, or falls, and, thereby, closes an electrical circuit driving an electrical actuating device (hereinafter referred to as a motor) for moving the indicating mechanism, and for moving a member carrying said control device, whereby, when the indicating device has been moved by an amount proportional to the load pan, the said member will be moved to bring the arm into its neutral position, thereby interrupting the electrical circuit and stopping the motion; movement of the arm to one side causing the motor to be driven in one direction, and movement of the arm to the other side causing the motor to be driven in a reverse direction.

Some practical embodiments are illustrated, by way of example, upon the accompanying drawings, wherein—

Fig. 1 is a diagrammatic view of one embodiment;

Fig. 6 is a diagrammatic view of a further embodiment;

Fig. 7 illustrates constructional details of the embodiment shown in Fig. 6; and Fig. 8 shows a modification of the embodiment shown in Fig. 6.

Figure 2:
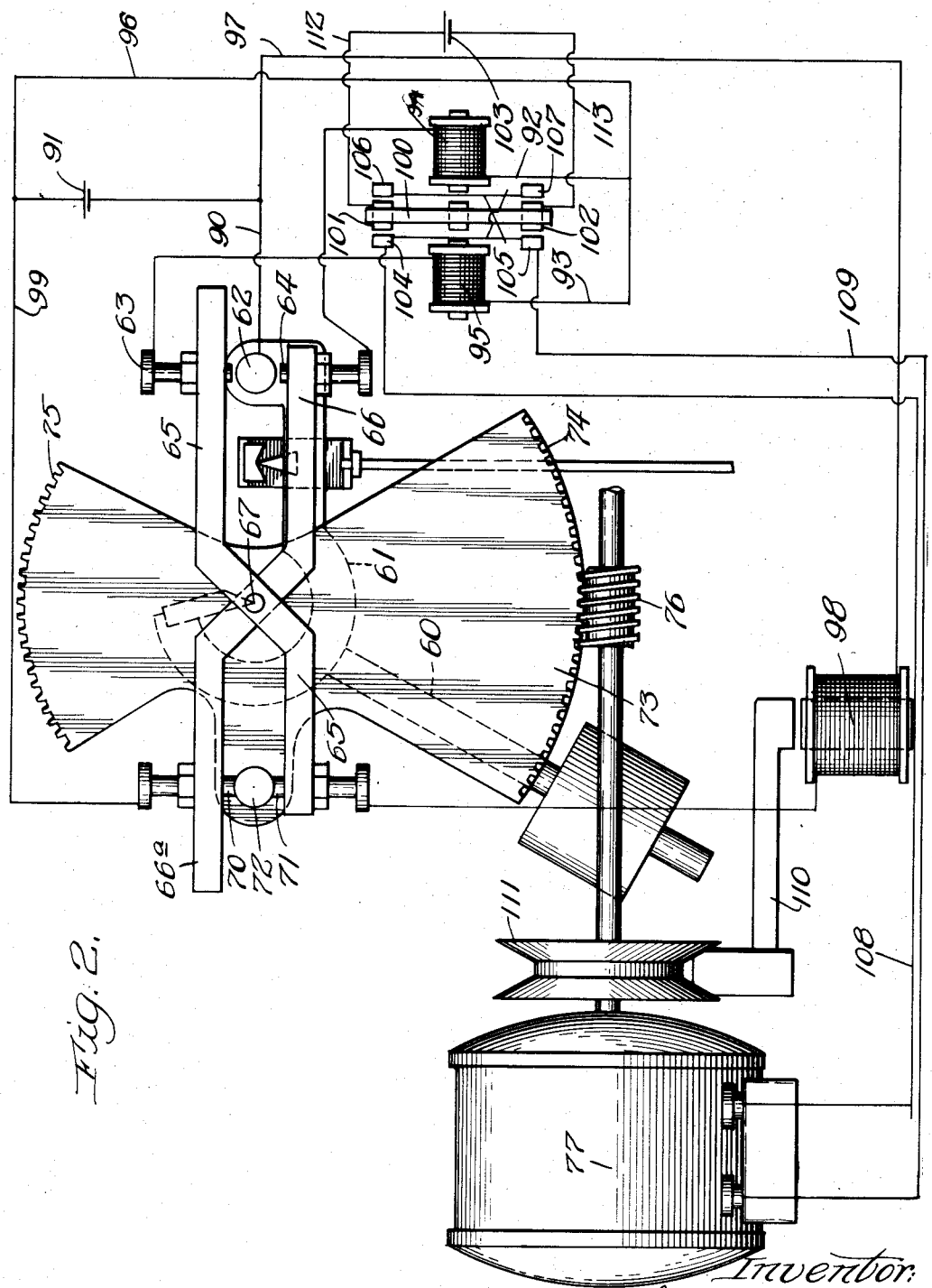
Fig. 2 is a diagrammatic view of another embodiment.

In Fig. 1, the load pan 1 of the weighing mechanism rests on the weigh-beam 2 and is provided with check link mechanism 3 and a pendulum resistant 4 connected to said check link mechanism in the usual manner. The load is represented conventionally by the device 5.

The weigh-beam is provided with a movable weight responsive contact element or contact arm 6 carrying a contact member 7 (hereinafter termed 'arm contact'). Two adjustable circuit contacts in the form of contact screws 8 and 9 (hereinafter called 'lever contacts') are provided, one on each side of the arm contact, these lever contacts being located on the free ends of levers 10 and 11 pivotally mounted on a support 12 of insulating material and connected to each other by a rod 13 of insulating material which passes through a hole 14 in the support. This support 12 is of angular shape having lugs 15 thereon carrying the pivots for the levers and having an adjustable contact screw 16 (hereinafter termed 'support contact') adapted to contact with the one lever 11; a weight 17 being provided on this lever 11 normally to hold it against the support contact.

The support 12 is fixed upon an endless belt 18 which passes around two pulleys 19 and 20 rotatably mounted on fixed shafts 21 and 22, the shafts having further pulleys 23 and 24 mounted thereon and fixed to rotate with the pulleys 19 or 20, said further pulleys 23 and 24 being, preferably, larger in size than the pulleys 19 and 20. One of these pulleys 24 is connected by a belt 26, or other power transmission device, to an electric motor 27, while the other pulley 23 is similarly connected to a drum 28 on which is fixed one end of a band 29 bearing the indicating chart, so arranged that the band can be wound on the drum. The band passes, around an idle drum 30, behind an opening 31 in the indicator casing 32 and is wound on a primary drum 33 from which it is drawn by the first-mentioned drum 28; a spring (not shown) being provided on the primary drum to wind the band back.

The lever contacts 8 and 9 are connected by means of the conductors 35 and 36 with the windings 37 and 38 of electro-magnets, or other electro-magnetic devices, represented by 39 and 40 which serve, when energized, to operate a change-over switch indicated at 41; the circuit through the windings 37 and 38 being completed by the conductors 42 and 43, the battery, or other source of current 44, the conductors 45 connected to the weighbeam, the arm 6 and arm contact 7. Moreover, the change-over switch 41 is adapted to connect an electrical circuit 47 containing a battery, or other source of current 48, with the electric motor 27 either through the conductor 49, or through the conductor 50, according to the direction in which the switch is 'thrown', or moved. When the motor is connected through the circuit 50 it is driven in an opposite direction to that in which it is driven when connected through conductors 49. The support contact 16 is connected in a shunt circuit 52 of the battery 44, which shunt circuit is completed through the lever 11, conductors 36, winding 38 and conductor 42; and the shunt circuit 52 contains an electro-magnet 54, the armature 55 of which is fixed on an arm 56 carrying a brake 57 for the motor.

Thus the support, the levers, the lever contacts and the arm contact constitute a relay, the parts being connected in different local circuits containing the electro-magnetic devices (hereinafter termed 'switch magnets') for operating the change over switch adapted to start the motor running in either of two directions and containing the electromagnetic device operating the brake for the motor. The two lever contacts and the arm contact are, therefore, connected in two parallel branches of an electrical circuit, each branch containing an electro-magnet which operates the switch, and all the parts are so arranged that when the arm contact 7 moves against one of the lever contacts, say 8, one branch of the electrical circuit is closed, to energize one switch magnet 39, thereby causing this magnet 39 to move the switch and close a circuit through 50 which makes the motor rotate in one direction, while when the arm contact 7 moves against the other lever contact 9, the switch magnet 40 in the other branch is energized to move the switch and close a circuit through 49 which makes the motor rotate in a reverse direction.

The motor drives, through the belting described, the belt 18 on which the support 12 is fixed, so that the support is moved upwardly or downwardly (relative to the position shown in the drawings) according to the direction in which the motor is driven.

Moreover, the circuit, closed as aforesaid by the arm contact and either contact 8 or 9, will remain closed until the support has moved sufficiently to bring the lever contact away from the arm contact, the amount of movement depending upon the extent to which the scale pan is moved so that movement of the parts will be proportional to the movement of the pan.

The circuit containing the electro-magnet 54 operates a brake for the motor, this magnet being energized to supply the brake when the parts of the apparatus are in equilibrium.

In operation, when a load or weight is placed upon the scale pan the arm contact 7 moves to make contact with the lever contact 9 and, in addition, the lever carrying this contact is also moved thereby, thus causing it to break the support contact 16, de-energizing the brake magnet so as to release the latter and energizing the switch magnet 40 causing this to start the motor and move the support member and the band in the manner explained. The support member 12 moves downwardly until the lever contact breaks with the arm contact when the switch magnet 40 is again de-energized, thus releasing the switch so that this opens the circuit and stops the motor. At the same time the circuit 52 through the support contact 16 is also restored to apply the brake.

When the support moves downwardly too far or when the scale pan moves upwardly the arm contact 7 moves against the remaining lever contact 8 so as to energize the other switch magnet 39 and thus cause the switch to change over the motor, to run in an opposite direction to that occasioned by a downward movement of the pan 1. At the same time the lever 10 through the connecting link 13 acts to move the lever 11 and thereby break the circuit 52 through the support contact 16 and de-energize the brake magnet 54. This contact between 7 and 8 is again interrupted and the brake magnet circuit through 16 restored when the support, and, consequently, the band, attain their proper position.

Figure 3:
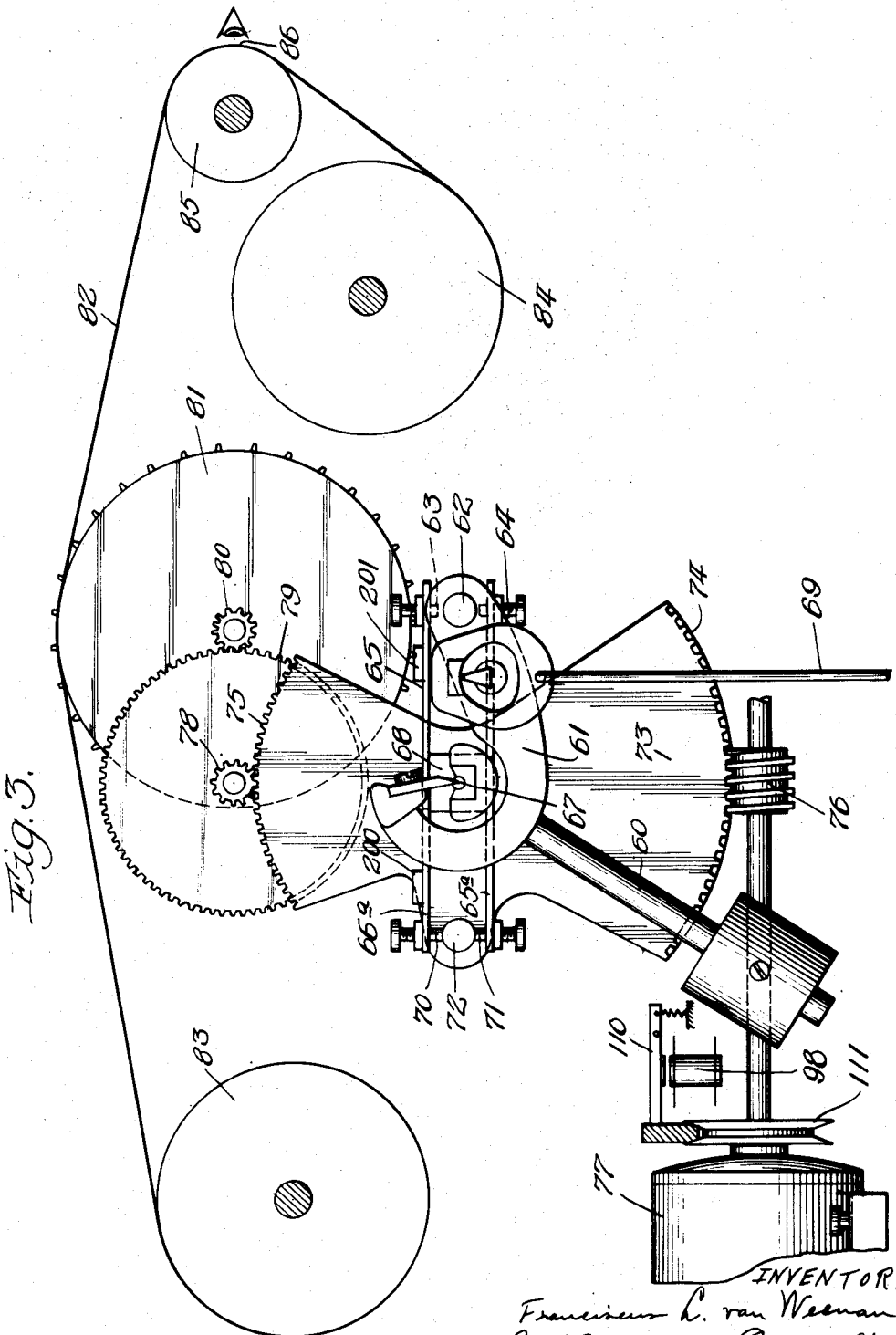
Figs. 3, 4 and 5 illustrate constructional details of the embodiment shown in Fig. 2.
Figure 4:
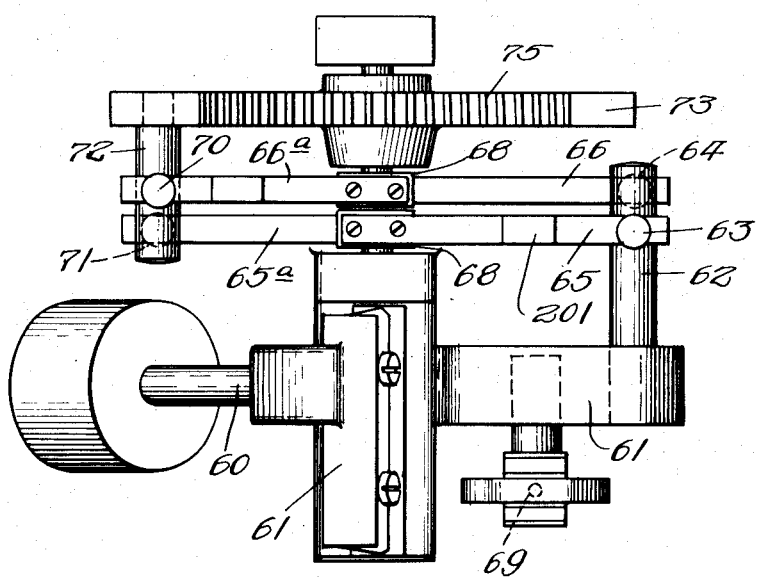

In an alternative embodiment shown in Figs. 2–5 in which the control is associated with the pendulous resistant instead of with the weigh-beam, the pendulum 60 is provided with a movable weight responsive contact element or contact arm 61 carrying the arm contact 62 which, as before, co-operates with two adjustable lever or circuit contacts 63 and 64 mounted on the adjacent ends of two levers 65 and 66. These levers 65 and 66 are mounted side by side on a trunnion 67 and, in a practical embodiment shown in Figs. 3, 4 and 5 each comprise square blocks 68 of insulating material having bars marked 65 and 65ᵃ and 66, 66ᵃ which are fixed to the opposite sides of the blocks and extend laterally of the trunnion in opposite directions. The arm is connected to the weighing mechanism by the rod 69 (Fig. 3). The aforesaid lever contacts 63 and 64 are mounted one on each of the arms of said levers which extend in one direction (these will be hereinafter referred to as 'arm lever contacts') other lever contacts 70 and 71 mounted on the ends of the arms of the levers which extend in the opposite direction co-operate with a contact 72 mounted on a movable quadrant 73 and these will accordingly be hereinafter referred to as 'quadrant lever contacts'. The quadrant, which is rotatably mounted on the same axis as the levers and pendulum, is preferably a double quadrant having teeth on both arcuate surfaces 74 and 75 with one 74 of which meshes a worm 76 driven from the electric motor 77 constituting the prime mover for operating the quadrant, and the teeth on the other arcuate surface 75 meshes with gearing 78, 79 and 80 adapted to augment or increase the movement, and rotate a spiked drum 81 operating the band 82. The band 82 is mounted on drums 83 and 84 and passes around an idle roller 85 at the indicating point 86.

The arm contact 62 is connected in a circuit 90 to one pole of a battery or other current source 91, the other pole of which is connected by a circuit 96 to two parallel circuits 92 and 93 through the switch magnets 94 and 95 to the lever contacts 63 and 64. Circuit 90 contains a shunt circuit 97 passing through the brake magnet 98 and being connected to quadrant contact 71 while circuit 96 is provided with a shunt circuit 99 connected to the quadrant contact 70. The movable arm 100 of the change-over switch has its contacts 101 and 102 connected by leads 112 and 113 to the battery 103 and the fixed contacts 104, 105 and 106, 107 by the circuits 108, 109 to the motor as shown. The brake arm 110 operated by magnet 98 co-acts with a grooved pulley 111 on the motor shaft.

The arms, levers, quadrants and their contacts therefor constitute, as in the previous embodiment described with reference to Fig. 1, a relay, the parts being connected in different local circuits containing electro-magnetic devices, the arm lever contacts being connected in two parallel branches of an electrical circuit each containing an electro-magnet, these magnets operating a change-over switch adapted to start the motor running in either of two directions according to which circuit is closed, while the quadrant lever contacts are connected in a circuit containing an electro-magnet to operate a brake for the motor.

With this alternative form, in operation, when a load or weight is placed upon the scale pan, the pendulum 60 tends to move, rotatively, to a certain position and in so doing moves the arm contact so as to make contact with one of the lever contacts 63 or 64. This moves one lever and acts to break the circuit between the quadrant lever contact 70 or 71 thereon and the quadrant contact. The quadrant lever contacts and quadrant contact normally complete a circuit through the brake magnet and battery 91 to apply the brake but the aforesaid movement of the lever interrupts the circuit so that the brake is released. The current which then flows through the brake magnet is diverted to the branch electric circuit 90, 96 and 92 or 93 connected with the arm contact and lever arm contact which are brought together, thereby operating the electric magnet 94 or 95 in the branch circuit, moving the change-over switch to complete a circuit 112, 113, 109 and 108, supplying the motor, and this in turn rotates the quadrant. The quadrant moves the band, and, also, when it has moved by an amount corresponding to that of the lever, it will re-establish the circuit between the quadrant contact and the lever contacts, thereby again applying the brake and interrupting the circuit through the change-over switch magnet. If in the above operation the motor moves the band too far, or the load of weight is removed from the scale pan, the arm contact and the other lever arm contact will be brought together closing the other branch circuit containing the other switch magnet, thus moving the switch so as to cause the motor to rotate in an opposite or reverse direction. In this case again, of course, the circuit of the brake magnet will be interrupted and the current diverted, and after the parts have regained their proper relative position will be re-made, as before.

Moreover, a separate contact (not shown) will be provided to interrupt the circuit through the brake magnet when the weighing scale is unloaded.

Figure 5:
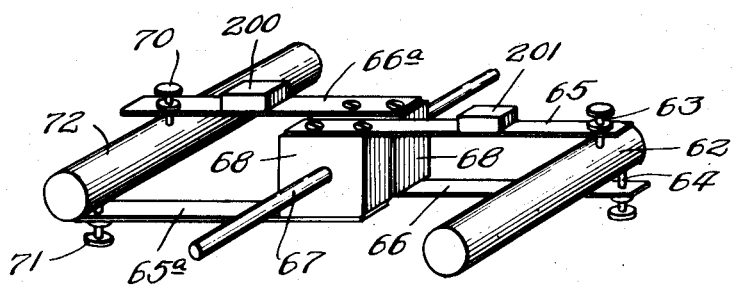

As shown in Fig. 5, a weight 201 tends to rotate one block 68 keeping the contacts 63 and 71 in contact with the arm contact 62 and quadrant contact 71. A weight 200 tends to rotate the other block 68 counter-clockwise, keeping the contacts 64 and 70 in contact with their respective arm contacts 62 and 72. Assuming that the arm contact 62 has been lowered, as viewed in Fig. 5, to rotate the arm 66 with its block 68 clockwise an amount determined by the weight on the scale pan, the quadrant 72 is rotated clockwise by the motor, as explained above. While the quadrant contact 72 is rotating the contact on the arm 65$^a$ bears against the quadrant contact 72 and as soon as the quadrant contact 72 has rotated sufficiently to touch the contact 70, the contact 64 is at the same time separated from the arm contact 64, thus simultaneously establishing the brake actuating circuit through contacts 70, 72 and 71 and breaking the motor actuating circuit through the contacts 62 and 64. The contacts 63 and 64 are, of course, both set to be slightly separated from the arm contact 62 when the contacts 70 and 71 both bear against the quadrant contact 72.

In the practical embodiment shown diagrammatically, in Figs. 6 and 7, the load pan 120 of the weighing mechanism rests on the weigh-beam 121 and is provided with check-link mechanism 122 and a pendulum resistant 123 connected to said weighing mechanism in the usual manner.

A rod 124 connects the weighing mechanism of the weighing scale to a movable weight responsive contact element or lever 125, pivoted at 126, on one end of which lever is fixed a ball, pin or other projection 127 (hereinafter termed a pin) and on the other end of which is fixed a counter-balance weight 128 approximately to balance the system.

Two electrical circuit contacts or contact screws 129 and 130, fixed on, but insulated from, an extension 131 of a toothed sector 132, are located one at either side of said pin 127. The toothed quadrant is pivoted to rock upon the same pivot 126 as the said lever. This sector 132 drives, through gearing 133, 134 and 135, a rotatable shaft 136 carrying a cylinder 137, with a graduated scale or numerals and a brake pulley 140, both of which are fixed thereon. A brake block 141 is so mounted on a lever 142 that it is normally held by a spring 143 against the brake pulley but is moved by an electro-magnet 144 or the like away from the brake pulley, against the action of a spring, when the magnet is energized.

The rotatable shaft 136 is connected to a driving shaft 146 of a reversible electric motor 147 by means of a friction clutch indicated at 148, constituted by a spring located between collars on the two shafts.

In addition to the cylinder 137, fixed on the rotatable shaft, two further cylinders 138 and 139 are rotatably mounted on said shaft and arranged that these cylinders are automatically given a small amount of rotary movement each time the fixed cylinders or an adjacent cylinder (as the case may be) has made a complete rotation; such an arrangement being well known in connection with counters.

The lever and contact screws constitute a relay, the parts being connected in different local electrical circuits so connected to a source of supply, and to the reversible electric motor, as to drive the motor in either of two directions, at will, and said circuits containing the electro-magnetic device for the brake aforesaid.

The motor is, for instance, provided with three terminals 150, 151 and 152, two of which 150 and 152 are connected by leads 153 and 154 one to each of the contact screws 129 and 130, the remaining terminal 151 being connected by leads 155 through the electro-magnet 144 to the lead 156 of the source of supply 157, the circuit being completed from the source of supply to the pin 127 on the end of the lever by the lead 158. A shunt circuit 159 and 160 is provided through the mechanism operating the brake shoe, this shunt circuit being interrupted when the brake shoe is lifted as the right-hand end of the lever 142 comes out of contact with the fixed contact 190 to which the lead 159 is connected.

Shock absorbers 164 and 165 are associated with the said rod 127, two preferably being provided, one for the upward movement and one for the downward movement, so as to allow the rod to extend on the application of a heavy load or shock.

An eccentric 166 associated with the pendulous resistant and connected with the weighing mechanism by a steel band 167 is so shaped that the movement of the lever per unit of weight on the scale plate is always the same.

Turnably mounted at 168 to the toothed sector is one end of a depending member 169, which has at its other end 170 bifurcated to fit on either side of a projection 171 on the weighing mechanism; and this depending member is also turnably jointed at 172 intermediate its ends to a stay link 173 having a fixed pivot 174 at its opposite end. This constitutes a safety device which acts to check the movement of the beam 121 when there is too great a load suddenly placed on the load pan 120. Thus if the spring of the shock absorber becomes fully compressed it is not able to absorb any more shock and there would be a tendency to bend the rod 125 which is not very strong. Therefore the projections on the bifurcated end 170 are arranged to engage the projection 171 to take care of any sudden movement of the beam 121 which cannot be absorbed by the shock absorbers 164 and 165. This extra shock is therefore transmitted to the rather strong extension 131 and also aids the motor in moving the toothed sector 132 in the desired direction.

In operation, when a load is placed upon the load pan, plate or platform 120 (hereinafter termed load pan) the pin 127 on the end of the lever 125 makes contact with one of the electrical contact screws 129 or 130 and tends to turn the toothed sector. This completes one of the electrical circuits to the electro-magnet 144 and motor 147, thus lifting the brake shoe 141 and driving the motor in one direction and this, in turn, drives the rotatable shaft 136 which, through the gearing, turns the toothed sector in the same direction as that in which the pin 127 on the lever tends to turn it. The sector thus follows the pin until the lever is in a position, in which equilibrium is established when the lever will become stationary but the sector will continue to move so that contact between the pin and the screw is broken, and thus the electro-magnet is again de-energized and the brake is applied.

When the toothed sector moves too far or when the load pan moves upwardly (due, for instance, to removal of the load) the pin contacts with the other electrical screw contact so that another part of the electrical circuit is completed to drive the motor in the opposite direction, this then rotates the rotatable shaft in the opposite direction and through the gearing also turns the toothed sector in the opposite direction until the contact between the pin and screw is broken.

The toothed sector will always move by an amount corresponding to the movement of the load pan, and will operate, as aforesaid, the rotatable shaft to cause the counter to indicate the valve of the load on the pan.

As it is essential that the lever operates with very slight friction, it must be made light in weight and must not be subject to any heavy pressure, or strain; therefore, the shock absorbers are provided so that, when a heavy load is placed upon the load pan, the projection engaging in the bifurcated end of the depending member will knock against one of the bifurcations and this relieves the said lever. All the other parts of the indicating mechanism can be made very strong, as the friction in these does not influence the weighing mechanism.

The invention is also applicable to computing scales, in which case a series of gears are provided one for each price per unit of weight, any one of which gears can be brought into operation between the counter for weight and that for the computed price.

In a modification shown in Fig. 8 only one counter weight 180 is provided (in place of the pendulum resistant 123 and the counter weight 128 on the pivoted lever) this counter weight being mounted on an arm 181 of a lever 182 which extends at one side of its pivot 183, the other arm of said lever being connected by a link 184 to another lever 185 near one end 186, at which it is pivoted to the toothed sector and the other end of this second lever carrying the pin co-operating with the electric contact screws 129 and 130, as before.

With the electrical circuit described in all the embodiments, the electric current is not interrupted but is merely diverted from one circuit to another so as to obviate sparking at the ends of the contact screws and thereby avoid undue wear and tear thereof. A switch may be provided to switch off the current in the normal or no-load position of the scale.

I claim:—

1. In a weighing apparatus, the combination with a load pan, of an indicator and electrical driving mechanism therefor having two branch circuits, an arm connected with said load pan and movable to opposite sides of a neutral position, contact means on said arm connected with each of said circuits, an additional contact in each of said circuits, said contact means on said arm closing one of said two branch circuits by engaging the additional contact in that branch and when said arm is moved to a corresponding side of its neutral position, one of said branch circuits being connected to drive said mechanism and move said indicator in one direction, the other of said branch circuits being connected to drive said mechanism and move said indicator in the opposite direction, and means for stopping said driving mechanism when said indicator has moved proportionately to the weight on said load pan.

2. In a weighing apparatus, the combination with indicating mechanism, of a reversible electric motor for driving said indicating mechanism, an electrical circuit having branches connected to said electric motor, a weight responsive element movable in one direction to close one branch of said electric circuit by means movable with said weight responsive element, said last mentioned means also being adapted to close the other of said branch electrical circuits when said weight responsive element is moved in another direction, electromagnetic means, and a change-over switch connected to said branches, each of said branches being also connected to said electromagnetic means and being adapted to actuate said electromagnetic means so that the latter will operate said change-over switch.

3. In a weighing apparatus, the combination with a load pan, of indicating mechanism, a reversible electric motor driving said mechanism, an arm connected with said load pan and movable to opposite sides of a neutral position, contact means on said arm, an electrical circuit having two branches for operating said motor in opposite directions, said contact means closing one of said branches of said electrical circuit when said arm is moved to one side or the other of its neutral position, electromagnetic means, and a change-over switch connected to said branches, each of said branches of said circuit being connected to said electromagnetic means for operating said change-over switch.

4. In a weighing apparatus, indicating mechanism, electrical actuating means for said indicating mechanism, a weight responsive element movable to close a circuit for driving said actuating means, means automatically interrupting said circuit when said indicating mechanism has moved proportionately to said weight responsive element, and an additional circuit providing an alternative path for the current when said first circuit is interrupted.

5. In a weighing apparatus, a load pan, an indicator and electrical driving mechanism therefor, two normally open electrical circuits for actuating said mechanism, an element movable by said load pan to opposite sides of a neutral position, contact means on said element, said contact means closing one of said circuits when said element is moved to one side of its neutral position, said contact closing the other of said circuits when said element is moved to the other side of its neutral position, one of said circuits being connected to drive said mechanism and move said indicator in one direction, the other of said circuits being connected to drive said mechanism and move said indicator in the opposite direction, and an additional circuit providing an alternative path for the current when said first and second circuits are interrupted to maintain said contact means in good condition.

6. In a weighing apparatus, an indicating mechanism, electric driving mechanism for said indicating mechanism, an electrical circuit for actuating said driving mechanism, brake mechanism, a weight responsive element movable to close one of said circuits for driving said driving mechanism, means automatically interrupting said circuit when said indicating mechanism has moved proportionally to said weight responsive element, and a circuit providing an alternative path for the current when said first circuit is interrupted, said last-mentioned circuit including electromagnetic operating means for said brake mechanism, said brake mechanism being applied to said driving mechanism and released therefrom substantially simultaneously with the interruption and closing respectively of the circuit for said driving mechanism.

7. In a weighing apparatus, a load pan, an indicator and electrical driving mechanism therefor, a plurality of electrical circuits for actuating said mechanism, an element movable by said load pan to opposite sides of a neutral position, contact means on said element, said contact means closing one of said circuits when said element is moved to one side of its neutral position, said contact closing a second of said circuits when said element is moved to the other side of its neutral position, one of said circuits being connected to drive said mechanism and move said indicator in one direction, the other of said circuits being connected to drive said mechanism and move said indicator in the opposite direction, a brake mechanism adapted to be applied to said driving mechanism, and electro-magnetic means the energizing circuit of which is closed and interrupted substantially simultaneously with the closing and interruption respectively of the circuit to the driving mechanism.

8. In combination with weighing apparatus having a movable weight responsive element, of an indicator, an electric driving mechanism for said indicator controlled by means operatively connected to said weight responsive element, said indicator comprising a pair of drums and a band with indicating characters wound about said drums.

9. In a weighing apparatus, a load pan, an indicator and electrical driving mechanism therefor, separate circuits for independently actuating said mechanism, an element movable by said load pan and having separate contact means thereon connected to each of said circuits, a pair of connected levers each having a lever contact to cooperate with said selected ones of said first contact means for closing separate circuits, said circuits being connected to drive said indicating mechanism to move said indicator in opposite directions, brake mechanism for said driving mechanism, a brake circuit including electro-magnetic operating means for said brake mechanism, said last-mentioned circuit having a contact co-operating with a contact on one of said levers, said levers being movable by the contact of said contact means on said element with either of the contacts on said levers to separate the contact in said brake circuit from its contact on said lever, and means actuated by said driving means separating said contact means on said element from its co-operating lever contact and connecting the contact in said brake circuit with its contact on said lever when said indicator has moved proportionally to the weight on said weight pan.

10. In a weighing apparatus, a load pan, a pivoted toothed quadrant, indicating mechanism actuated by said quadrant, an electric motor geared to said quadrant, electro-magnetic brake mechanism for said motor, a pendulous resistant, an arm having a contact thereon movable by said resistant, a contact on said sector, a pair of pivoted levers one lever of which is mounted at one side of said quadrant contact and the other lever of which is mounted on the opposite side of said arm contact, a second pair of pivoted levers each of which is mounted on opposite sides of said quadrant and arm contacts so that said sector and arm contacts extend between a lever of each pair, a contact on each end of the levers on opposite sides of said quadrant contact establishing a circuit through said electro-magnetic brake mechanism, contacts on the ends of the levers on opposite sides of the arm contact each of which co-operates with said arm contact to establish separate circuits depending upon the direction of movement of said arm contact, each of said separate circuits causing said motor to rotate in different directions.

11. In a weighing apparatus, indicating mechanism, electrical actuating means for said indicating mechanism, a pivoted contact arm, a load pan connected to said arm at one side of its pivot, a counterbalance on said arm, contacts co-operating with said contact arm each of which establish separate circuits through said contact arm for causing said actuating means to drive said indicating mechanism in opposite directions, and means automatically interrupting the established separate circuit when said indicating mechanism has moved proportionally to said load pan.

12. In a weighing apparatus, indicating mechanism, electrical actuating means for said indicating mechanism, a load pan, a contact arm, a shock absorbing device through which the weight is transmitted from said load pan to said contact arm, contacts co-operating with said contact arm each of which establish separate circuits through said contact arm for causing said actuating means to drive said indicating mechanism in opposite directions, and means automatically interrupting the established separate circuit when said indicating mechanism has moved proportionally to said load pan.

13. In a weighing apparatus, indicating mechanism, electrical actuating means therefor, a contact element movable by said weighing apparatus, a circuit established by said contact element for moving said indicating mechanism proportionally to the weight on said apparatus, a pendulous resistance counterbalancing the load of the weighing apparatus, an eccentric member provided on said pendulous resistance and connected to said weighing apparatus by a flexible member, said eccentric being so shaped that the movement of the contact element per unit of weight on the weighing apparatus is always the same.

14. In a weighing apparatus, a toothed quadrant, a contact element pivoted on said quadrant, a load pan connected to said element, a motor geared to said toothed quadrant, a brake for said motor normally held in operative position, electro-magnetic means for moving said brake out of operative position, an arm on said quadrant carrying contacts at opposite side of said contact element, said contact element forming a circuit with either of said first-mentioned contacts for driving said motor in opposite directions, each of said circuits including said electromagnetic means for releasing said brake.

15. In a weighing apparatus, a toothed quadrant, a contact element pivoted on said quadrant, a lever pivoted on said quadrant one arm of which is connected to the load pan and the other end of which is connected to a combined counterweight and pendulous resistant, connecting means between said first and second-mentioned levers, a motor geared to said quadrant, electro-magnetic braking mechanism, contacts on said quadrant at opposite sides of said contact element, said contact element forming a circuit with either of said first-mentioned contacts for driving said motor in opposite directions, each of said circuits including said electromagnetic means for releasing said brake.

16. A weighing apparatus comprising an arm responsive to movements of a load platform on said weighing apparatus, indicating means for indicating the weight of articles placed on said load pan, means on said indicating means movable therewith, contacts on said means supported by said indicating means, a reversible motor for driving said indicating means in opposite directions, a pair of circuits for selectively driving said motor in opposite directions, a switch adapted to connect a source of power in either of said circuits, and a second pair of circuits operatively connected to said contacts and to said arm, said last-mentioned circuits being adapted to operate said switch to selectively control the circuits to the motor to thereby drive the motor in one direction or the other, said circuits for controlling the switch being closed by movements of said arm in either direction.

17. A weighing apparatus comprising an arm responsive to movements of a load platform on said weighing apparatus, indicating means for indicating the weight of articles placed on said load pan, means on said indicating means movable therewith, contacts on said means supported by said indicating means, a reversible motor for driving said indicating means in opposite directions, a pair of circuits for selectively driving said motor in opposite directions, a switch adapted to connect a source of power in either of said circuits, and a second pair of circuits each having an electromagnet therein adjaent said switch, said electromagnets controlling said switch to selectively connect either of said first-mentioned circuits with a source of power so as to selectively drive said motor in opposite directions and thereby control the movement of said indicating means, said circuits for controlling the operation of said switch being selectively connected with a source of power by the movement of said arm into engagement with one or the other of the contacts on the means supported by said indicating means.

In testimony whereof I have signed my name to this specification on this 25th day of April, A. D. 1928.

FRANCISCUS LAMBERTUS van WEENEN.